United States Patent
Jeong et al.

(10) Patent No.: US 9,783,137 B2
(45) Date of Patent: Oct. 10, 2017

(54) SOUND QR SYSTEM FOR VEHICULAR SERVICES

(71) Applicants: POWERVOICE CO., LTD., Bucheon-si (KR); HALLA MEISTER LTD., Seoul (KR)

(72) Inventors: Hee Suk Jeong, Gimpo-si (KR); Hyung Yup Lee, Yongin-si (KR); Se Hun Chin, Incheon (KR); Jong Sang Tack, Chuncheon-si (KR)

(73) Assignees: POWERVOICE CO., LTD., Bucheon-si (KR); HALLA HOLDINGS CORPORATION, Yongin-si (KR)

( * ) Notice: Subject to any disclaimer, the term of this patent is extended or adjusted under 35 U.S.C. 154(b) by 0 days.

(21) Appl. No.: 14/526,906

(22) Filed: Oct. 29, 2014

(65) Prior Publication Data

US 2015/0127228 A1    May 7, 2015

(30) Foreign Application Priority Data

Oct. 30, 2013  (KR) .................. 10-2013-0129757
Aug. 20, 2014  (KR) .................. 10-2014-0108399

(51) Int. Cl.
*B60R 22/00*    (2006.01)
*B60R 16/023*   (2006.01)
(Continued)

(52) U.S. Cl.
CPC .......... *B60R 16/023* (2013.01); *B60R 16/037* (2013.01); *B60R 16/0373* (2013.01); *H04B 11/00* (2013.01)

(58) Field of Classification Search
CPC ..... B60R 16/023; H04B 11/00; B60N 2/0248; B60N 2/0232; B60N 2/0244;
(Continued)

(56) References Cited

U.S. PATENT DOCUMENTS 6,420,975 B1 *  7/2002  DeLine .................. B60R 1/12
                                                340/425.5
2003/0067440 A1 *  4/2003  Rank .................. G06F 3/016
                                                345/156
(Continued)

FOREIGN PATENT DOCUMENTS

CN       102565831       7/2012
CN       202541435       11/2012
(Continued)

OTHER PUBLICATIONS

European Search Report—European Application No. 14191050.5 issued on Apr. 7, 2015, citing EP 1 902 906; EP 1 699 042; US 2011/223899; EP 1 738 964; KR 2003 0030729; Michael Sullivan "The sound of marketing; an overview of sound codes", 2013; James Holloway "SonicNotify: the inaudible QR codes your smartphone can hear", 2012; KR 2014 0065296 and KR 2013 0071613.
(Continued)

*Primary Examiner* — Shardul Patel
(74) *Attorney, Agent, or Firm* — Cantor Colburn LLP (57) ABSTRACT

A user device includes a storage device that stores a program for a vehicular service, a signal generation unit that generates a certain sound wave signal depending on the vehicular service, and a signal emission unit that emits the generated sound wave signal. When one component of a vehicle receives and recognizes the emitted sound wave signal, the vehicle provides the vehicular service based on the emitted sound wave signal.

18 Claims, 8 Drawing Sheets

(51) Int. Cl.
  *B60R 16/037* (2006.01)
  *H04B 11/00* (2006.01)
(58) Field of Classification Search
  CPC ..... B60Q 2310/12; G01S 13/00; G05B 11/01; G08G 1/00
  USPC .......................... 701/49; 38/86, 71.4, 122, 91
  See application file for complete search history.

(56) References Cited

U.S. PATENT DOCUMENTS

| | | | | | |
|---|---|---|---|---|---|
| 2007/0179680 | A1* | 8/2007 | Tamura | ............... | B60Q 5/00 701/1 |
| 2008/0048908 | A1* | 2/2008 | Sato | ............... | B60R 16/0373 342/200 |
| 2008/0140422 | A1* | 6/2008 | Hovestadt | ............... | G10L 15/26 704/275 |
| 2011/0090338 | A1* | 4/2011 | DeLine | ............... | B60R 1/12 348/148 |
| 2011/0193426 | A1* | 8/2011 | Chung | ............... | H02K 33/16 310/25 |
| 2011/0197233 | A1* | 8/2011 | Paik | ............... | H04W 4/18 725/62 |
| 2011/0223899 | A1* | 9/2011 | Hiraide | ............... | G08C 17/02 455/420 |
| 2013/0046510 | A1* | 2/2013 | Bowne | ............... | G06Q 10/0833 702/187 |
| 2013/0134730 | A1* | 5/2013 | Ricci | ............... | G06F 9/54 296/24.34 |
| 2013/0304475 | A1* | 11/2013 | Gratke | ............... | H04R 3/00 704/270 |
| 2014/0088794 | A1* | 3/2014 | Yashiro | ............... | G08C 17/02 701/2 |
| 2014/0278025 | A1* | 9/2014 | Flick | ............... | B60W 10/02 701/113 |
| 2014/0285337 | A1* | 9/2014 | Gebhardt | ............... | B60R 25/102 340/521 |
| 2014/0376587 | A1* | 12/2014 | Sakashita | ............... | B60W 10/08 374/1 |
| 2015/0127208 | A1* | 5/2015 | Jecker | ............... | B62D 15/025 701/23 |
| 2015/0163306 | A1* | 6/2015 | Nakagawa | ............... | B60R 25/2018 709/225 |
| 2015/0237246 | A1* | 8/2015 | Omi | ............... | H04N 5/2353 348/362 |

FOREIGN PATENT DOCUMENTS

| | | |
|---|---|---|
| EP | 1699042 | 9/2006 |
| EP | 1738964 | 1/2007 |
| EP | 1902906 | 3/2008 |
| JP | 2001036652 | 2/2001 |
| JP | 2001078276 | 3/2001 |
| JP | 2004282157 | 10/2004 |
| JP | 2005320708 | 11/2005 |
| JP | 2006021687 | 1/2006 |
| JP | 2009288167 | 12/2009 |
| JP | 2010179875 | 8/2010 |
| JP | 2012506221 | 3/2012 |
| KR | 1020030021783 | 3/2003 |
| KR | 1020030030729 | 4/2003 |
| KR | 101166351 | 7/2012 |
| KR | 1020130071613 | 7/2013 |
| KR | 1020140065296 | 5/2014 |

OTHER PUBLICATIONS

Michael Sullivan, The Sound of Marketing; An Overview of Sound Codes, SFA Marketing, 2013.
James Holloway, SonicNotify: The inaudible QR codes your smartphone can hear, Gizmag, 2012.

* cited by examiner

| HEADER | | | | DATA | TAIL | |
|---|---|---|---|---|---|---|
| H1 | H2 | H3 | H4 | Data | T1 | T2 |

| INAUDIBLE FREQUENCY BAND | | | AUDIBLE FREQUENCY BAND | |
|---|---|---|---|---|
| SYMBOL | F1(Hz) | F2(Hz) | SYMBOL | F(Hz) |
| 0 | . | . | 0 | . |
| 1 | . | . | 1 | . |
| 2 | . | . | 2 | . |
| 3 | . | . | 3 | . |
| 4 | . | . | 4 | . |
| 5 | . | . | 5 | . |
| 6 | 17578.13 | 18843.75 | 6 | 5718.75 |
| 7 | 17718.75 | 18843.75 | 7 | 6281.25 |
| 8 | 17859.38 | 18843.75 | 8 | 7312.50 |
| 9 | . | . | 9 | . |
| ! | . | . | # | . |
| # | . | . | $ | . |
| $ | . | . | % | . |
| % | . | . | & | . |

FIG. 8A

REMOTE CONTROLLER : volume down

| HEADER | | | | DATA | TAIL | |
|---|---|---|---|---|---|---|
| P | N | 1 | A | 05 | + | / |

FIG. 8B

DMB : CHANNEL SEARCH

| HEADER | | | | DATA | TAIL | |
|---|---|---|---|---|---|---|
| P | N | 1 | A | 22 | + | / |

FIG. 8C

MAP : ROUTING CANCELLATION

| HEADER | | | | DATA | TAIL | |
|---|---|---|---|---|---|---|
| P | N | 1 | A | 35 | + | / |

FIG. 8D

Audio : PLAYING A PREVIOUS SONG

| HEADER | | | | DATA | TAIL | |
|---|---|---|---|---|---|---|
| P | N | 1 | A | 52 | + | / |

FIG. 8E

Video : FINISH OF VIDEO

| HEADER | | | | DATA | TAIL | |
|---|---|---|---|---|---|---|
| P | N | 1 | A | 61 | + | / |

SOUND QR SYSTEM FOR VEHICULAR SERVICES

CROSS-REFERENCE TO RELATED APPLICATION

This application claims the benefit of Korean Patent Application No. 10-2013-0129757 filed on Oct. 30, 2013 and Korean Patent Application No. 10-2014-0108399 filed on Aug. 20, 2014, the disclosures of which are incorporated herein by reference.

TECHNICAL FIELD

The embodiments described herein pertain generally to a sound QR system for vehicular services.

BACKGROUND

In recent, many option devices capable of implementing electronic control within a vehicle have been supplied. For example, option devices such as a seat adjustment device, an air-conditioning control device and a navigation device of a vehicle can be controlled by a mobile device connected to a radio access device (access point; AP) like Wi-Fi or Bluetooth.

With respect to a method for controlling functions within a vehicle by using such a mobile device connected to a radio access device, Korean Patent Application Publication No. 2014-0065296 describes an intelligent power seat adjustment system using a smart phone and a method thereof. In addition, Korean Patent Application Publication No. 2013-0071613 describes a vehicular air-conditioning device having a remotely controlling function, which uses a mobile communication device, and a method for remotely controlling a vehicular air-conditioning device by using a mobile communication device.

However, since the radio access device has to be additionally provided in the interior of the vehicle, it would cause problems of costs or interior design. Further, there is a drawback since in operating the mobile device to be connected to the radio access device, the connection is delayed, and it is difficult and inconvenient to use the mobile device due to problems in hardware, software, a screen size and input interface of the mobile device and others.

In addition, there is a problem in that since the technology using Bluetooth necessarily requires the Tethering process, it is difficult to rapidly control option devices within a vehicle.

SUMMARY

In view of the foregoing, example embodiments conveniently and quickly provide a user with various vehicular services by using a sound wave signal, without accessing a separate radio communication device or the like.

However, the problems sought to be solved by the present disclosure are not limited to those described above, and other problems can be clearly understood by those skilled in the art from the following description.

In one example embodiment, a user device includes: a storage device that stores a program for a vehicular service; a signal generation unit that generates a certain sound wave signal depending on the vehicular service; and a signal emission unit that emits the generated sound wave signal. When one component of a vehicle receives and recognizes the emitted sound wave signal, the vehicle provides the vehicular service based on the emitted sound wave signal.

In another example embodiment, a user device includes: a storage device that stores a program for a vehicular service; a signal reception device that receives a certain sound wave signal emitted from a vehicle; and a processor that searches a vehicular service corresponding to the received sound wave signal to implement certain operation for the searched vehicular service.

In still another example embodiment, a method for providing a vehicular service by using a sound QR system includes: storing a program for a vehicular service; receiving a certain sound wave signal emitted from a mobile device; and searching a vehicular service corresponding to the received sound wave signal to implement certain operation for the searched vehicular service. The certain sound wave signal is transmitted through an inaudible or audible frequency band, and differently generated in the mobile device depending on the vehicular service.

In accordance with the example embodiments, it is possible to rapidly and stably provide a user with various vehicular services in a sound QR system environment implementing control based on a sound wave signal without requiring connection to a separate radio access device or network.

In accordance with the example embodiments, since a user device, and a signal emission unit (e.g., a speaker) and a signal reception device (e.g., a microphone) equipped in a vehicle are used, a separate module does not need to be provided, so that costs can be reduced, and anyone of all ages and both sexes can easily and conveniently use the services.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

DETAILED DESCRIPTION

Hereinafter, example embodiments will be described in detail with reference to the accompanying drawings so that inventive concept may be readily implemented by those skilled in the art. However, it is to be noted that the present disclosure is not limited to the example embodiments but can be realized in various other ways. In the drawings, certain parts not directly relevant to the description are omitted to enhance the clarity of the drawings, and like reference numerals denote like parts throughout the whole document.

Throughout the whole document, the terms "connected to" or "coupled to" are used to designate a connection or coupling of one element to another element and include both a case where an element is "directly connected or coupled to" another element and a case where an element is "electronically connected or coupled to" another element via still another element. In addition, the term "comprises or includes" and/or "comprising or including" used in the document means that one or more other components, steps, operations, and/or the existence or addition of elements are not excluded in addition to the described components, steps, operations and/or elements.

In this document, a "unit" includes units realized by hardware, software and both hardware and software. In addition, one (1) unit may be realized by using two (2) or more hardware systems, and two (2) or more units may be realized by one (1) hardware system.

Throughout the whole document, part of operation or functions that are described to be implemented by a terminal or a device may be implemented by a server connected to the corresponding terminal or device. Likewise, part of operation or functions that are described to be implemented by a server may also be implemented by a terminal or device connected to the corresponding server.

Example embodiments, which are described hereinafter, are detailed descriptions of the present disclosure to facilitate understanding of the present disclosure and do not limit the scope of the present disclosure. Thus, the subject matter implementing the same scope of functions as that of the present disclosure also fall within the protection scope of the present disclosure.

Figure 1:
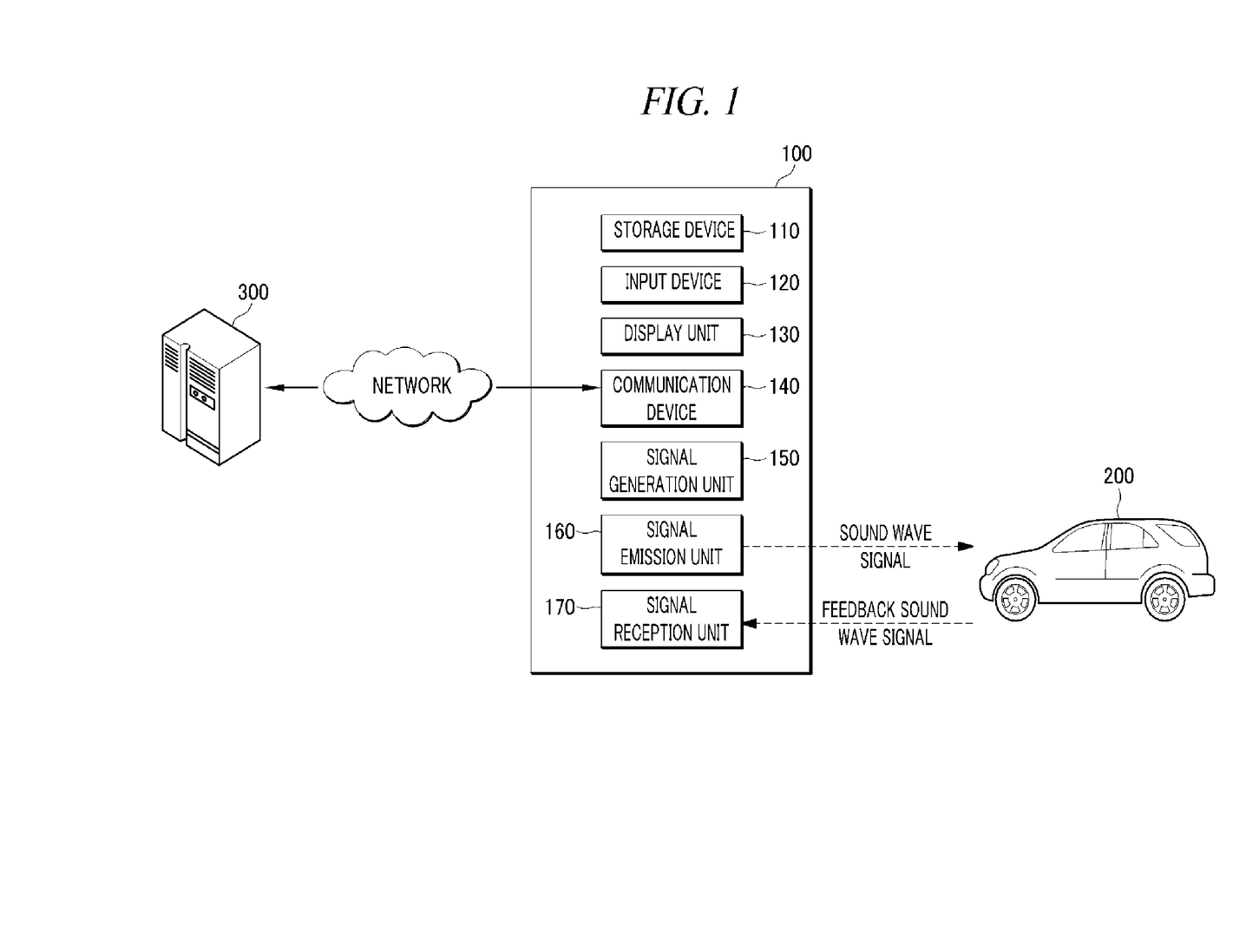
FIG. 1 is a configuration view of a sound QR system for vehicular services in accordance with an example embodiment.

FIG. 1 is a configuration view of a sound QR system for vehicular services in accordance with an example embodiment.

The sound QR system provides various controls and services, by transmitting and receiving a sound wave signal through devices (e.g., a speaker and a microphone) essentially equipped in a user device, without using a separate communication module like Wi-Fi or Bluetooth technology.

Example embodiments suggest a sound QR system for vehicular services or a send-to-car service.

With reference to FIG. 1, the sound QR system for vehicular services may include a user device 100, a vehicle 200 and a server 300.

The user device 100 may be realized by a mobile device, which can access a server through a network. Here, the mobile device is a mobile communication device assuring portability and mobility and may include, for example, any type of a handheld-based wireless communication device like a personal communication system (PCS), a global system for mobile communication (GSM), a personal digital cellular (PDC), a personal handyphone system (PHS), a personal digital assistant (PDA), international mobile telecommunication (IMT)-2000, code division multiple access (CDMA)-2000, W-code division multiple access (W-CDMA), a wireless broadband Internet (WiBro) terminal, a long term evolution (LTE) terminal, a smart phone, a smart pad, a tablet PC and so on. However, since the type of the user device 100 illustrated in FIG. 1 is merely illustrative for convenience in descriptions of the present disclosure, the type and the form of the user device 100 in accordance with example embodiments is not construed as being limited to that illustrated in FIG. 1.

With reference to FIG. 1, the user device 100 may include a storage device 110, an input device 120, a display unit 130, a communication device 140, a signal generation unit 150, a signal emission unit 160 and a signal reception device 170. However, the user device 100 illustrated in FIG. 1 is merely one example embodiment of the present disclosure, and may be variously modified based on the components illustrated in FIG. 1.

The storage device 110 may store a multiple number of programs or applications, and additionally generated or transmitted and received information. A multiple number of the programs or applications may be downloaded through the server to be provided in the user device 100 or might be provided at the time of manufacture of the user terminal 100.

In accordance with example embodiments, the storage device 110 may store programs for vehicular services. Also, the storage device 110 may store a mapping table, which pre-defines relationship between a symbol and a frequency range, and detailed descriptions in this regard will be provided later.

Additionally, the storage device 110 may be, but is not limited to, a volatile memory like DRAM and SRAM, or a non-volatile memory like a flash memory and SSD.

The input device 120 may be realized by user interface for receiving input of certain instructions or information from a user. Here, the user interface may be generally an input device like a keyboard, a keypad, a mouse or others, but may be graphical user interface (GUI) represented on an image display device.

The display unit 130 may be controlled to display information stored in the user device 100 or transmitted and received information on a display screen of the user device 100. A display screen, to which a touch recognition technology is applied, may operate as a type of the input device 120.

In accordance with an example embodiment, the display unit 130 may be controlled to display certain information included in a feedback sound wave signal received from the vehicle 200 on the screen.

The communication device 140 may be realized by one module, which transmits and receives information with other devices including the server 300 through a network and includes an antenna, a converter, a filter and others, but is not limited thereto.

In general, the network means a connection structure capable of enabling information exchange between nodes such as terminals and servers, and examples for the network include, but are not limited to, a 3GPP (3rd Generation Partnership Project) network, a long term evolution (LTE) network, a world interoperability for microwave access (WIMAX) network, the Internet, a local area network (LAN), a wireless local area network (Wireless LAN), a wide area network (WAN), a personal area network (PAN), a Bluetooth network, a satellite broadcasting network, an analogue broadcasting network, a digital multimedia broadcasting (DMB) and so on.

The signal generation unit 150 may generate various signals each time a pre-set event occurs.

In accordance with an example embodiment, the signal generation unit 150 may generate a certain sound wave signal depending on vehicular services. For example, the signal generation unit 150 may generate a first sound wave signal for a first vehicular service, and a second sound wave signal for a second vehicular service. Here, the sound wave signal may be a sound wave of an audible frequency band that average human beings can hear, or a sound wave of an inaudible frequency band that average human beings cannot hear.

The signal emission unit 160 converts variation of an electrical signal into sound vibration to emit the sound wave to peripheral space.

In accordance with an example embodiment, the signal emission unit 160 may emit a signal generated in the signal generation unit 150 or the certain sound wave signal to periphery of the user device 100.

The signal emission unit 160 may be realized, for example, by loudspeakers such as a horn speaker, a dome speaker, a condenser speaker, a ribbon-type speaker, an ion speaker, a piezoelectric speaker, and a coaxial speaker, but is not limited thereto.

The signal reception device 170 may convert sound energy generated in the periphery of the user device 100 into electric energy.

In accordance with an example embodiment, the signal reception device 170 may receive, from the vehicle 200, a feedback sound wave signal generated in response to the sound wave signal emitted from the signal emission unit 160. That is, the signal reception device 170 may detect a feedback sound wave signal from various sound wave signals (e.g., music, conversation, vehicle noise and others) received from the interior or exterior of the vehicle 200.

The signal reception device 170 may be realized by microphones such as a dynamic microphone, a condenser microphone, and a piezoelectric microphone, but is not limited thereto.

The vehicle 200 may receive the above-described certain sound wave signal emitted from the user device 100, and generate and emit a feedback sound wave signal in response to the certain sound wave signal. In this case, the vehicle 200 may be an ordinary automobile available in the market, and equipped or provided with separate configuration to receive the certain sound wave signal and generate and emit the feedback sound wave signal. For example, the vehicle 200 may be any one of a sedan, a limousine, a coupe, a convertible, a van, a wagon, a hatchback, a bus, a truck, and a motorcycle.

The vehicle 200 may be subject to an approval-permission process with the user device 100 for control of various electronic devices within the vehicle, and synchronize various data with the user device 100.

In accordance with an example embodiment, when the sound wave signal emitted from the user device 100 is received and recognized by one component of the vehicle, the vehicle 200 may provide a vehicular service based on the emitted sound wave signal.

Here, the vehicular service may include a navigation service, a driving convenience service, an air-conditioning control service and a vehicle diagnosis service. Operation of each of the components of the user device 100 according to the vehicular services is described in detail with reference to FIG. 2 to FIG. 5. That is, as parts or all of the components of the user device 100 operate, various vehicular services for the vehicle 200 can be provided.

Figure 2A:
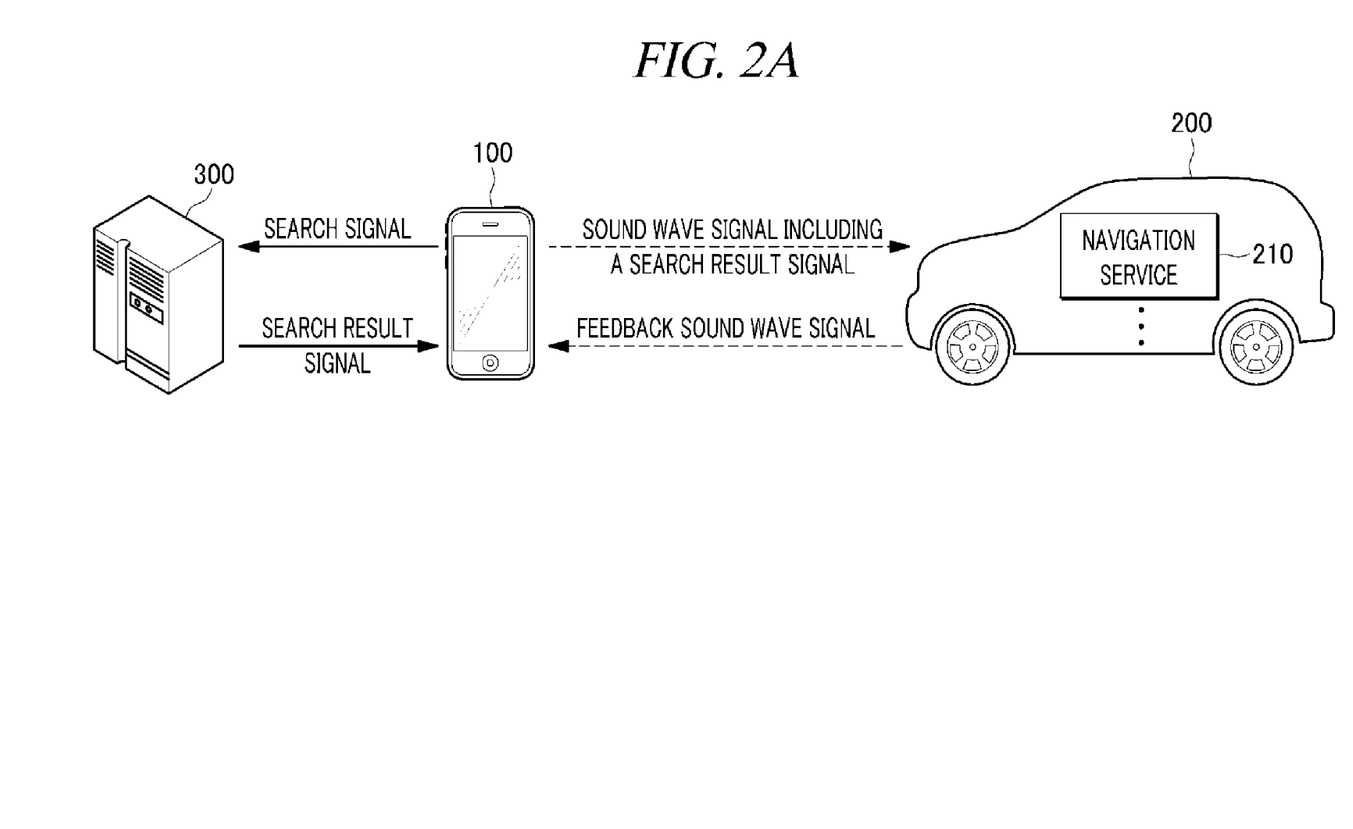
FIG. 2A and FIG. 2B show operation of a navigation service among vehicular services in accordance with an example embodiment.
Figure 2B:
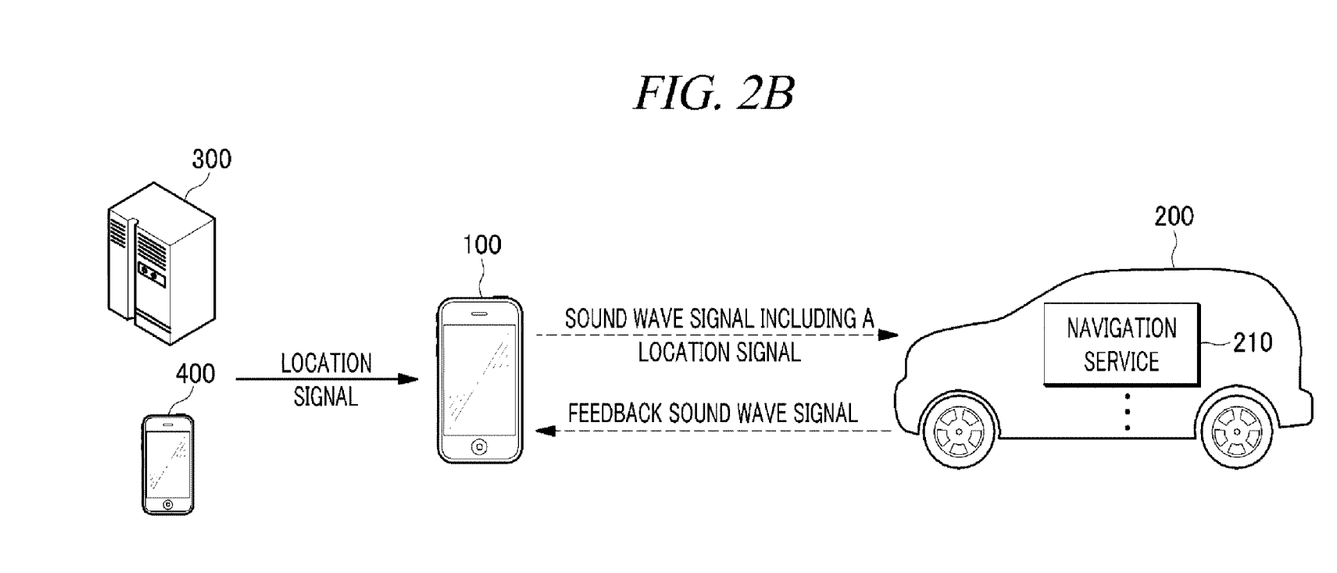

FIG. 2A and FIG. 2B show operation of a navigation service among the vehicular services in accordance with an example embodiment.

With reference to FIG. 2A and FIG. 2B, the user device 100 may include a storage device 110, an input device 120, a display unit 130, a communication device 140, a signal generation unit 150, a signal emission unit 160 and a signal reception device 170.

The storage device 110 may store at least one application or program including a vehicular service application, and may store search information generated as destination search is conducted, search result information, or various transmitted or received information.

The input device 120 may be realized by user interface for receiving input of destination search information from a user.

The display unit 130 may be controlled to display destination search and search result information or transmitted and received information on the display screen of the user device 100.

The communication device 140 in accordance with an example embodiment illustrated in FIG. 2A may transmit, to the server 300, a search signal generated as destination search is conducted by a user for a navigation service 210 among the vehicular services. Also, the communication device 140 may receive a search result signal indicating a result of the destination search from the server 300 through a network.

The signal generation unit 150 illustrated in FIG. 2A interworks with the communication device 140 in accordance with an example embodiment, and in case of occurrence of an event where a user searches specific location, the signal generation unit 150 may generate a sound wave signal including the search result signal.

The communication device 140 in accordance with another example embodiment illustrated in FIG. 2B may receive, from another device 400 or server 300, a location signal including certain location information for the navigation service 210 among the vehicular services.

In case of occurrence of an event where the communication device 140 in accordance with another example embodiment receives location information for a specific place or GPS values (for example, a latitude value and a longitude value) from another device or server, the signal generation unit 150 illustrated in FIG. 2B may generate a sound wave signal including the location signal.

The signal emission unit 160 may emit the search result signal or the location signal generated from the signal generation unit 150 into peripheries.

The signal reception device 170 may receive, from the vehicle 200, a feedback sound wave signal generated in response to the sound wave signal including the search result signal or the location signal emitted from the signal emission unit 160.

The vehicle 200 may provide the navigation service 210 among the vehicular services based on the sound wave signal including the search result signal or the location signal.

The navigation service 210 may be realized as described below.

In accordance with an example embodiment, User A may search location information for a preferred restaurant in a specific district by using a smart phone equipped with a GPS device. In this case, portal search engine (e.g., Google, NAVER, Daum and so on) supporting rich natural language search (artificial intelligence or semantic search) may be used. For example, through natural language search like "a Chinese restaurant around the Grand Central 42st station", "Starbucks at the Brooklyn Bridge-City Hall station", "father's house", "Tony Stark", "Adam's house" or others, desired destinations can be found with GPS data values, while being interworking with favorites, in which addresses or location are registered, or an address book of a user smart phone. User A may choose one restaurant in a result list showing restaurant list information together with location of restaurants on a map, comments on restaurants and others, and the smart phone may generate a sound wave signal including a search result signal corresponding to the information of the chosen restaurant B. The generated sound wave signal including the search result signal is emitted, and the vehicle can receive the emitted sound wave signal to navigate from current location to the restaurant B.

In accordance with another example embodiment, User C may search his/her location by using an application provided in his/her device, and transmit searched location information or GPS values to User D. A device of User D may receive a location signal including the location information of User C, and generate a sound wave signal including the location signal corresponding to the location information of User C. The generated sound wave signal including the location signal may be emitted into peripheries. If User D is located near his/her vehicle or in the inside of the vehicle, the vehicle may receive the sound wave signal including the location signal, and a navigation device equipped in the vehicle may provide User D with a navigation service based on the received sound wave signal to reach the location of User C.

As described, since the navigation service 210 does not require directly inputting a destination into the navigation device equipped in the vehicle, it is unnecessary to separately learn the operation of the navigation device. Further, even a user riding in a back seat can conveniently input a destination into the navigation device through his/her device.

Figure 3:
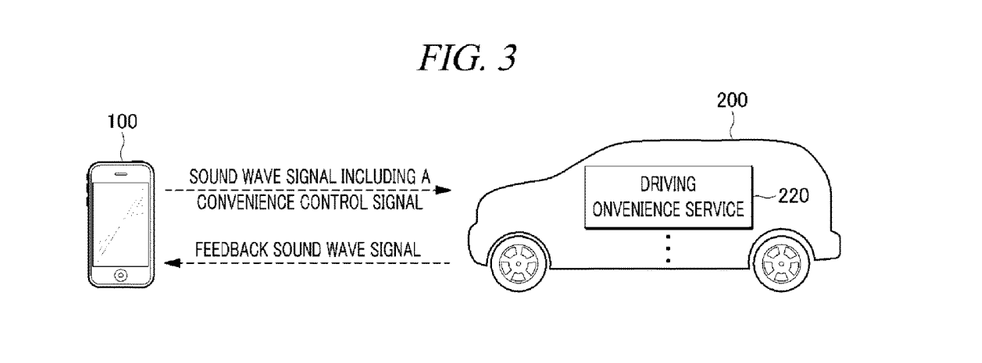
FIG. 3 shows operation of a driving convenience service among vehicular services in accordance with an example embodiment.

FIG. 3 shows operation of a driving convenience service 220 among the vehicular services in accordance with an example embodiment.

With reference to FIG. 3, the user device 100 may include the storage device 110, the input device 120, the display unit 130, the signal generation unit 150, the signal emission unit 160 and the signal reception device 170.

The storage device 110 may store at least one application or program including a vehicular service application, and may store information generated as convenience control setting is conducted, or various transmitted and received information.

The input device 120 may be realized by user interface generating a convenience control signal for a driving convenience service 220 among the vehicular services as at least one of seat setting, mirror setting, and steering wheel setting is chosen by a user.

Here, the seat setting may include an angle and height of a seat, distance between a pedal and a seat, and a temperature of a seat, the mirror setting may include positions of a room mirror and side mirrors, and the steering wheel setting may include a position and a temperature of a steering wheel.

For example, the input device 120 may generate a convenience control signal for at least one of the seat setting, the mirror setting, and the steering wheel setting through user interface. Here, the user interface includes one or more of interface recognizing movement of the user device 100, interface recognizing movement and a motion of a user through a camera, touch panel interface, hardware button input interface, and voice recognition interface, but is not limited thereto.

The display unit 130 may be controlled to display convenience control information or transmitted and received information for at least one of the seat setting, the mirror setting and the steering wheel setting on the display screen of the user device 100.

In case of occurrence of an event where the user sets convenience control, the signal generation unit 150 may generate a sound wave signal including a convenience control signal.

The signal emission unit 160 may emit the sound wave signal including the convenience control signal generated from the signal generation unit 150.

The signal reception device 170 may receive, from the vehicle 200, a feedback sound wave signal generated in response to the emitted sound wave signal including the convenience control signal.

The vehicle 200 may provide a driving convenience service 220 based on the sound wave signal including the convenience control signal.

The driving convenience service 220 may be realized as described below.

In accordance with an example embodiment, User A may set seats, mirrors, and the steering wheel to be in the state convenient for his/her driving by using a smart phone. For example, User A may input seat setting values such as "seat angle: 100°", "seat height: high", "distance between a pedal and a seat: close", and "seat temperature: 60° C.", mirror setting values such as "room mirror position: upward" and "side mirror position: downward", and steering wheel setting values such as "steering wheel position: forward" and "steering wheel temperature: 50° C.". User A may input a setting value for at least one of a seat, a mirror and a steering wheel, and the smart phone may generate a sound wave signal including a convenience control signal corresponding to the chosen convenience control setting value. The generated sound wave signal including the convenience control signal is emitted, and the vehicle may receive the emitted sound wave signal to implement driving convenience control for a seat, a mirror, a steering wheel and others.

The driving convenience service 220 can improve user convenience in using the driving convenience device, by pre-storing convenience control setting values by users, automatically identifying a user through sound wave communication when the user rides in the vehicle 200 later while carrying the user device 100, and adjusting the driving convenience device of the vehicle 200 to be suitable for the user based on the setting values for the corresponding user. In addition, since various buttons for memorizing the user setting values of the driving convenience device and controllers thereof do not need to be provided, costs and space for providing such various buttons and controllers can be saved.

Figure 4:
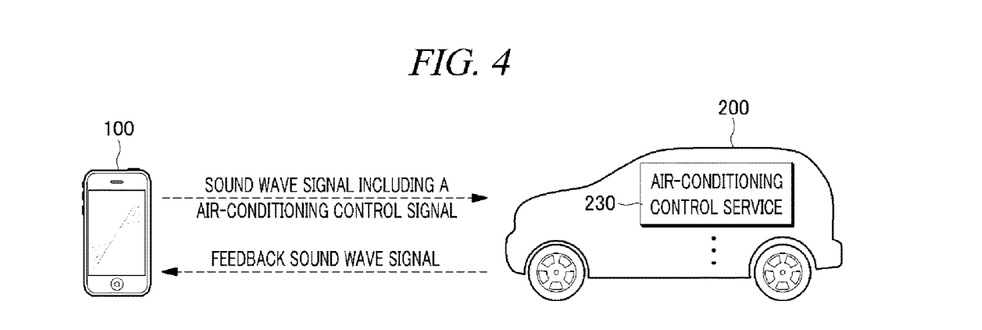
FIG. 4 shows operation of an air-conditioning control service among vehicular services in accordance with an example embodiment.

FIG. 4 shows operation of an air-conditioning control service 230 among the vehicular services in accordance with an example embodiment.

With reference to FIG. 4, the user device 100 may include the storage device 110, the input device 120, the display unit 130, the signal generation unit 150, the signal emission unit 160 and the signal reception device 170.

The storage device 100 may store at least one application or program including a vehicular service application, and information generated as air-conditioning control setting is conducted, or various transmitted and received information.

The input device 120 may be realized by user interface generating an air-conditioning control signal as setting for an air-conditioning device of the device 200 is conducted by a user for the air-conditioning control service 230 among the vehicular services.

Here, the setting for the air-conditioning device may include temperatures of an air conditioner and a heater, and a temperature, humidity and ventilation in the interior of the vehicle.

For example, the input device 120 may generate an air-conditioning control signal for at least one of the settings for the air-conditioning device through the user interface.

The display unit 130 may be controlled to display air-conditioning control information for at least one of temperatures of an air conditioner and a heater, and a temperature, humidity and ventilation in the interior of the vehicle on the display screen of the user device 100.

In case of occurrence of an event where the user sets air-conditioning control, the signal generation unit 150 may generate a sound wave signal including an air-conditioning control signal.

The signal reception device 170 may receive, from the vehicle 200, a feedback sound wave signal generated in response to the sound wave signal including the emitted air-conditioning control signal.

The vehicle 200 may provide the air-conditioning control service 230 based on the sound wave signal including the air-conditioning control signal.

The air conditioning service 230 may be realized as described below.

In accordance with an example embodiment, User A may set temperatures of an air conditioner and a heater, and a temperature, humidity and ventilation in the interior of the vehicle to be in the state convenient for the user's driving by using a smart phone. For example, User A may input air-conditioning control setting values such as "air-conditioner temperature: 27° C.", "heater temperature: 18° C.", "temperature in the interior of the vehicle: 20° C.", "humidity in the interior of the vehicle: 60%", and "ventilation in the interior of the vehicle: strong". User A may input a setting value for at least one of air-conditioning and heating temperatures or a temperature, humidity and ventilation in the interior of the vehicle, and the smart phone may generate a sound wave signal including an air-conditioning control signal corresponding to the chosen air-conditioning control setting value. The generated sound wave signal including the air-conditioning control signal is emitted, and the vehicle may receive the emitted sound wave signal to implement air-conditioning in the interior of the vehicle.

The air-conditioning control service 230 can improve user convenience in using the air-conditioning device, by pre-storing setting values for the air-conditioning device, and automatically adjusting the air-conditioning device through sound wave communication when the user rides in the vehicle 200 later while carrying the user device 100. Further, since signal transmission and reception are implemented by sound wave communication between a sensor and a control device or a driving device and a control device in the air-conditioning device, internal circuits are simplified so that product design can be facilitated, and causes for defects such as disconnection or short circuit are reduced so that reliability of a product can be improved.

Figure 5:
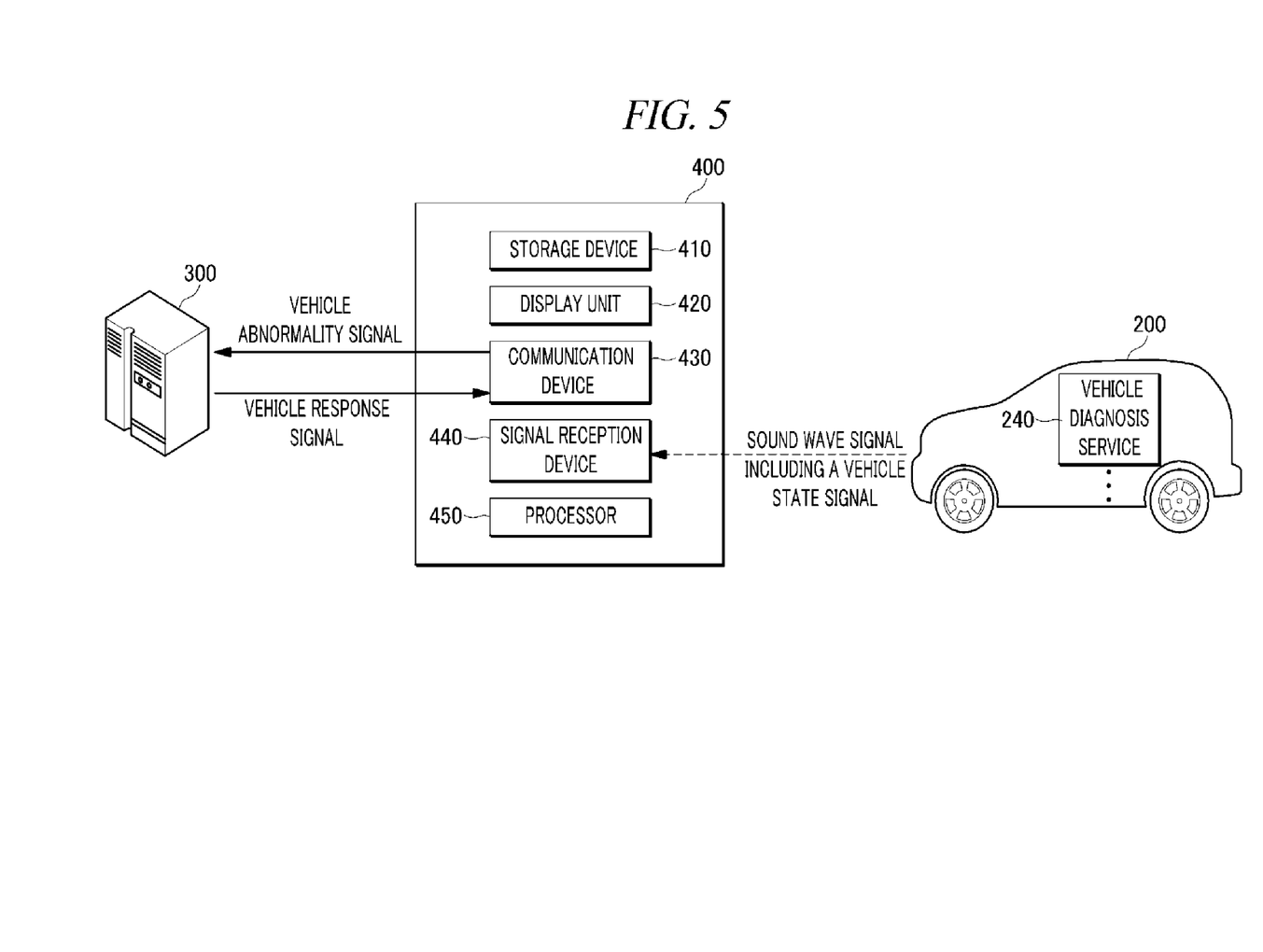
FIG. 5 shows operation of a vehicle diagnosis service among vehicular services in accordance with an example embodiment.

Meanwhile, FIG. 5 shows operation of a vehicle diagnosis service 240 among the vehicular services in accordance with an example embodiment.

With reference to FIG. 5, a user device 400 includes a storage device 410, a display unit 420, a communication device 430, a signal reception device 440 and a processor 450.

The components implementing the same functions as those illustrated in FIG. 1 are omitted hereinafter. However, the user device 400 illustrated in FIG. 5 is merely another example embodiment of the present disclosure, and may be variously modified based on the components illustrated in FIG. 5.

The storage device 410 may store at least one application or program, which includes a vehicular service application, and may store a check factor list for the vehicle 200 or transmitted and received vehicle state information. Here, the vehicular service application is an application capable of providing a user with the vehicle diagnosis service 240, and may be implemented by the processor 450, which is described later.

The display unit 420 may be controlled to display certain information corresponding to certain operation for vehicular services or certain information included in an extracted vehicle state signal on the display screen of the user device 400. Also, the display unit 420 may be controlled to display vehicle state information and vehicle response information on the display screen of the user device 400. For example, the display unit 420 may display various information included in the vehicle state signal in a pop-up notification form on the display of the user device 400.

The communication device 430 may transmit a vehicle abnormality signal within the extracted vehicle state signal to the server 300, and receive a vehicle response signal indicating a responsive measure to the vehicle abnormality signal from the server 300.

The signal reception device 440 may receive a certain sound wave signal emitted from the vehicle 200.

The processor 450 may search a vehicular service corresponding to the sound wave signal received by the signal reception device 440 and implement certain operation for the searched vehicular service.

In addition, if the searched vehicular service is the vehicle diagnosis service 240, the processor 450 may extract a vehicle state signal from the sound wave signal.

Here, the vehicle state signal may include a vehicle abnormality signal generated in the vehicle 200 when at least one of a multiple number of factors composing the check factor list for the vehicle 200 is abnormal.

Or, the vehicle state signal may include at least one of fuel information, oil information, internal temperature information, and driving information of the vehicle 200.

For example, the check factor list for the vehicle 200 may include at least one of state information (replacement date and a degree of wear) of a certain part of the vehicle 200, state information (replacement date) of engine oil and auto mission oil, brake lining, state information (replacement date and a degree of wear) of a tire, and others, and the driving information of the vehicle 200 may be an entire driving record after release of the vehicle or a driving record from starting the vehicle until the starting is turned off.

The processor 450 may be controlled to generate certain sound or vibration when the sound wave signal is received. In other words, the processor 450 may be controlled such that when abnormality occurs in the vehicle 200, the processor 50 extracts a sound wave signal including the vehicle state signal emitted from the vehicle 200, to generate certain sound or vibration in the user device 400.

For example, when a user using the vehicle diagnosis service 240 identifies a vehicle abnormality warning message, a vehicle abnormality signal is transmitted to a service center server 300 through radio communication of the user device 400, and a vehicle response signal indicating a responsive measure to the vehicle abnormality signal is received from the service center server 300, so that a measure, which can be taken in response to the vehicle abnormality state, may be displayed on the display of the user device 400.

The vehicle diagnosis service 240 may be realized as described below.

In accordance with an example embodiment, when at least one of a multiple number of the factors composing the check factor list for the vehicle is abnormal, the vehicle may emit a sound wave signal including a vehicle state signal (a vehicle abnormality signal). A smart phone receives the emitted sound wave signal including the vehicle abnormality signal, so that Use A can receive notification of vehicle abnormality warning through the smart phone. For example, the vehicle abnormality warning may generate vibration or sound together with a message reading "warning of a brake error". User A may identify the warning message, and if he/she requests vehicle abnormality diagnosis from the nearest service center through radio communication of the smart phone, he/she may receive a responsive measure from the service center to take an appropriate response measure. For example, as a responsive measure to the warning of a brake error, there may be a message reading "This is the A/S center for the automobile B. Please release the brake first. If the light is not still turned off, it means a signal notifying lack of brake liquid within the engine room. Please visit the nearest repair shop".

Since the vehicle diagnosis service 240 can provide vehicle diagnosis information, it is easy to provide information for repair and maintenance, and necessity for repair, nearby service center information and others can be promptly provided prior to occurrence of a breakdown. Further, in case of occurrence of a breakdown, the breakdown is notified to a driver so that a prompt response is possible.

The above-described method in accordance with the example embodiments can be embodied in a storage medium including instruction codes executable by a computer or processor such as a program module executed by the computer or processor. A computer readable medium can be any usable medium which can be accessed by the computer and includes all volatile/nonvolatile and removable/non-removable media. Further, the computer readable medium may include all computer storage and communication media. The computer storage medium includes all volatile/nonvolatile and removable/non-removable media embodied by a certain method or technology for storing information such as computer readable instruction code, a data structure, a program module or other data. The communication medium typically includes the computer readable instruction code, the data structure, the program module, or other data of a modulated data signal such as a carrier wave, or other transmission mechanism, and includes information transmission mediums.

The above-described method for providing vehicular services by using the sound QR system in accordance with the example embodiments are described with reference to FIG. 9.

Figure 9:
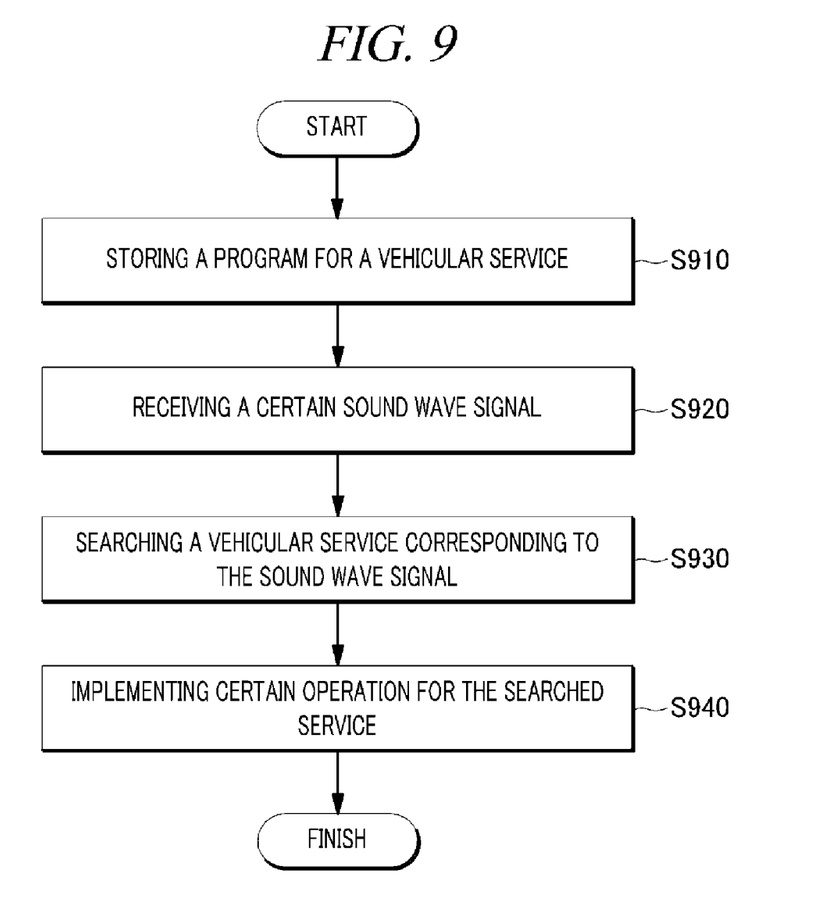
FIG. 9 is a flow chart of a method for providing vehicular services by using a sound QR system in accordance with an example embodiment.

FIG. 9 is a flow chart of a method for providing vehicular services using a sound QR system in accordance with an example embodiment.

First, a program for a vehicular service is stored (S910). The corresponding program may be provided and stored in a computing device within a vehicle. However, in case of a vehicle capable of conducting network communication, the corresponding program does not have to be stored in the vehicle.

A certain sound wave signal emitted from a mobile device or a user device is received by one component of the vehicle (S920). In case of receiving the certain sound wave signal and an unnecessary noise signal together, the certain sound wave signal may be extracted by a conventionally known technology.

Here, the certain sound wave signal is transmitted through an inaudible or audible frequency band, and differently generated depending on vehicular services in the mobile device or the user device. In accordance with an example embodiment, the certain sound wave signal may be a sine sound wave signal having a certain frequency as a center (mean or basic) frequency or a carrier frequency, and an analogue sound signal converted from a sine sound wave signal through codec. The corresponding codec may be implemented in a decoding device, and an encoding device corresponding to the decoding device may be included in the mobile device or user device.

A vehicular service corresponding to the received sound wave signal is searched (S930), and the vehicle implements certain operation for the searched vehicular service (S940). The stored program may be used upon the search, and an algorithm used in the searching process may be one of conventionally known methods.

Figure 6:
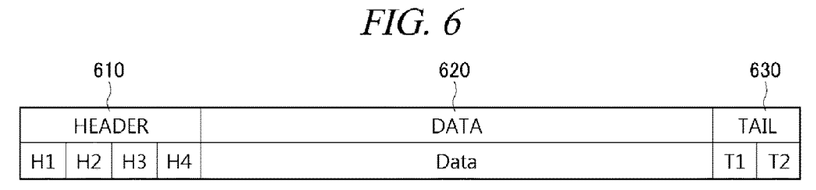
FIG. 6 shows a packet structure in accordance with an example for a communication protocol used in the sound QR system.

Meanwhile, FIG. 6 shows a packet structure in accordance with an example for a communication protocol used in the sound QR system.

The sound wave signal may consist of the packet structure illustrated in FIG. 6, and include a multiple number of symbols. Here, the symbol means a minimum unit of a code having meaningful information.

A header 610 is a packet, which implies start of a protocol for the sound QR system, and may consist of four (4) symbols. H1 and H2 of the header 610 may be codes used for product discrimination, and H3 and H4 may be codes used for version identification, but the present disclosure is not limited thereto.

Data 620 may include substantial information, length information, check sum information, error correction marks and others, and be variably applied depending on configuration of the symbols within the header 610. A tail 630 is a packet, which implies finish of the protocol for the sound QR system, and may consist of two (2) symbols.

Figure 7:
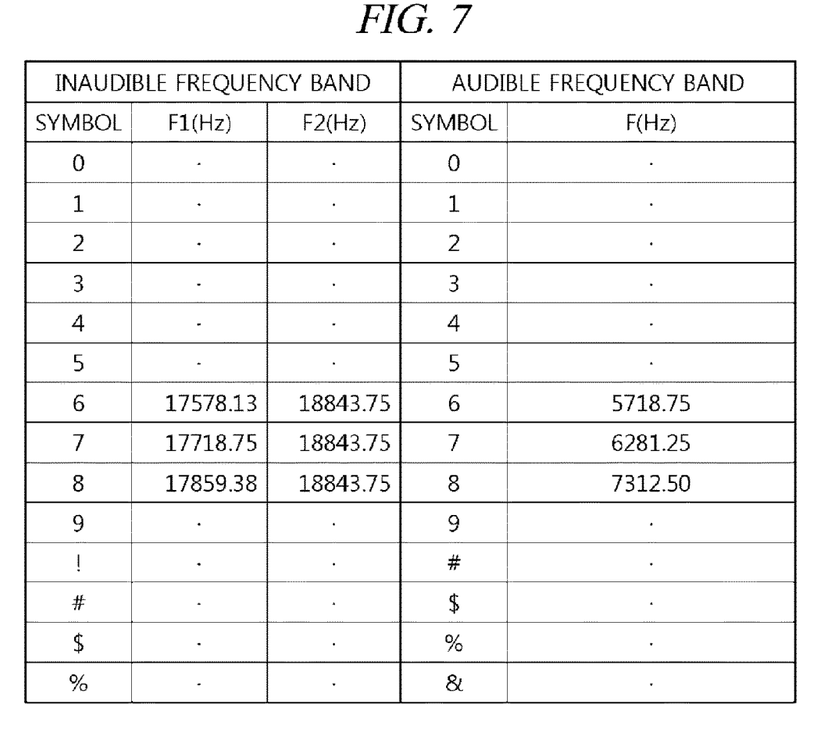
FIG. 7 shows an example for a mapping table, which maps each symbol within inaudible and audible frequency bands.

FIG. 7 illustrates an example for a mapping table, which maps each of the symbols within inaudible and audible frequency bands. Here, the mapping table may be a type of a code book.

With reference to the left table of FIG. 7, the symbols indicate different meanings depending on a certain frequency, a certain frequency range, or combination of a multiple number of frequencies within an inaudible frequency band. In the present disclosure, an inaudible frequency band of 16,000 Hz to 19,900 Hz may be used.

The storage device of the user device may store relationship between each of the symbols and the certain frequency (range) within an inaudible frequency band or relationship between each of the symbols and combination of a multiple number of frequencies within an inaudible frequency band in a mapping table. A multiple number of symbols may be determined by the mapping table, and a sound wave signal including the determined symbols may be used in the sound QR system.

For example, in the inaudible frequency band, Symbol 6 is defined as first frequency combination by a 17578.13 Hz (F1) frequency and a 18843.75 Hz (F2) frequency, and Symbol 8 is defined as second frequency combination by a 17859.38 Hz (F1) frequency and a 18843.75 Hz (F2) frequency. Depending on situation, a certain symbol within the inaudible frequency band may be defined as a third frequency by the F1 frequency or the F2 frequency. However, if a symbol is defined as combination of a multiple number of frequencies in the inaudible frequency band, more various information representations become possible within a limited frequency band, and discrimination of frequencies can be improved.

In addition, with reference to the right table of FIG. 7, the symbols indicate different meanings depending on a certain frequency within an audible frequency band. In the example embodiments, an audible frequency band of 1,700 Hz to 11,000 Hz may be used to increase sound, or an audible frequency band of 7,000 Hz to 16,000 Hz may be used to improve a recognition rate.

For example, in the audible frequency band, Symbol 7 is defined as a first frequency by a 6281.25 Hz (F) frequency, and Symbol 8 is defined as a second frequency by a 7312.50 Hz (F) frequency.

There may be the difference that even identical Symbol 8 may be defined as second frequency combination in the inaudible frequency band, while being defined as a second frequency in the audible frequency band.

The storage device of the user device may store a mapping table, which pre-defines relationship between each of the symbols and a certain frequency within an audible frequency band. A multiple number of symbols may be determined by the mapping table, and a sound wave signal including the determined symbols may be used in the sound QR system.

As described, the sound QR system can rapidly and stably provide various vehicular services together with a high recognition rate even in an environment of serious noise by using a sound wave signal including a symbol previously defined in an inaudible or audible frequency band.

For example, according to results of tests conducted in an environment where 60 dB noise occurs like an ordinary house, it was possible to provide a vehicular service with a 99% recognition rate for a vehicle located within 3 m from the user device, and the recognition speed was within 0.5 seconds.

FIGS. 8A-8E illustrate an example where the packet structure illustrated in FIG. 6 is used for a vehicular service.

With reference to FIGS. 8A-8E, "PN1A" of the header may mean ver.1A for Pilot Navi, "+/" of the tail may mean finish, combination of characters in the header, the data and the tail may vary depending on use, an object to be controlled, or a definition table.

Figure 8A:
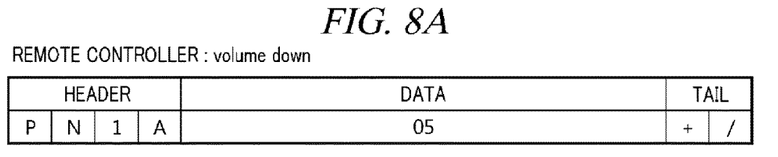
FIGS. 8A-8E illustrate various examples where the packet structure illustrated in FIG. 6 is used for vehicular services.
Figure 8B:
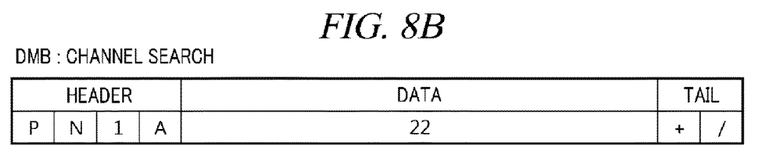

If data include "05" as in FIG. 8A, a function substantially identical to a volume reduction button of a remote controller can be implemented, and if data include "22" as in FIG. 8B, a function substantially identical to channel search of DMB can be implemented.

Figure 8C:
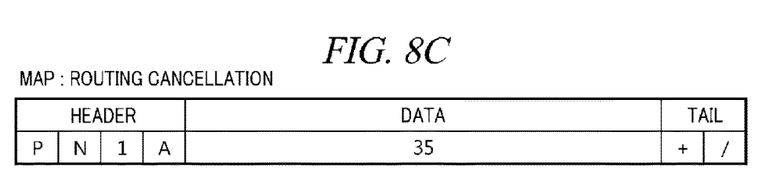
Figure 8D:
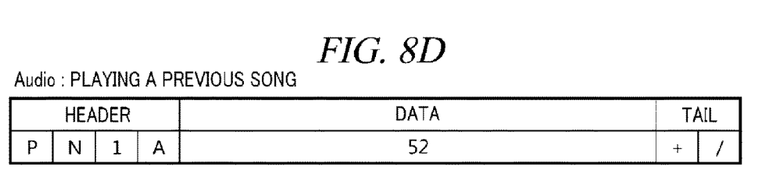
Figure 8E:
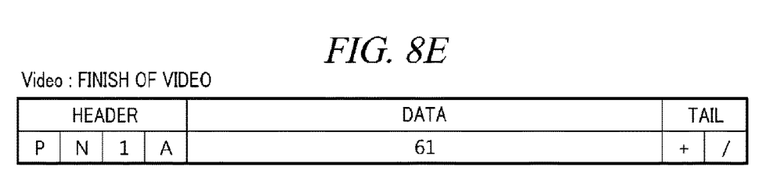

In addition, if data include "35" as in FIG. 8C, routing cancellation control for the navigation device can be implemented, if data include "52" as in FIG. 8D, a previous song of an audio device can be played, and if data include "61" as in FIG. 8E, finish instructions for a video device can be made.

It can be easily understood that such various electronic devices including a remote controller, DMB, a navigation device, and audio and video devices are connected to a vehicle in wired and wireless forms, and characters within data can be variously modified.

The above description of the example embodiments is provided for the purpose of illustration, and it would be understood by those skilled in the art that various changes and modifications may be made without changing technical conception and essential features of the example embodiments. Thus, it is clear that the above-described example embodiments are illustrative in all aspects and do not limit the present disclosure. For example, each component described to be of a single type can be implemented in a distributed manner. Likewise, components described to be distributed can be implemented in a combined manner.

The above description of the present invention is provided for the purpose of illustration, and it would be understood by those skilled in the art that various changes and modifications may be made without changing technical conception and essential features of the present invention. Thus, it is clear that the above-described embodiments are illustrative in all aspects and do not limit the present invention. For example, each component described to be of a single type can be implemented in a distributed manner. Likewise, components described to be distributed can be implemented in a combined manner.

The scope of the inventive concept is defined by the following claims and their equivalents rather than by the detailed description of the example embodiments. It shall be understood that all modifications and embodiments conceived from the meaning and scope of the claims and their equivalents are included in the scope of the inventive concept.

We claim:

1. A user device, comprising:
   a storage device configured to store a program for a vehicular service;
   a signal generation unit configured to generate a sound wave signal depending on the vehicular service;
   a signal emission unit configured to emit the sound wave signal; and
   a signal reception device configured to receive, from the vehicle, a feedback sound wave signal associated with the emitted sound wave signal,
   wherein when one component of the vehicle receives and recognizes the emitted sound wave signal, the vehicle provides the vehicular service based on the emitted sound wave signal,
   another component of the vehicle generates and emits the feedback sound wave signal in response to the emitted sound wave signal,
   the sound wave signal and feedback sound wave signal comprise a certain frequency corresponding to each of a plurality of symbols,
   the certain frequency is within an inaudible frequency band,
   the sound wave signal and the feedback sound wave signal are configured to control the user device or the vehicle to provide different vehicular services through the inaudible frequency band, and
   the user device and the one component of the vehicle communicate with each other based on a sound wave communication.

2. The user device of claim 1,
   wherein if the vehicular service is plural in number, the signal generation unit is further configured to generate a sound wave signal corresponding to a certain vehicular service selected by a user.

3. The user device of claim 1, further comprising:
a display unit configured to display certain information included in the feedback sound wave signal on a screen thereof.

4. The user device of claim 1, further comprising:
a communication device configured to transmit, to a server, a search signal generated as destination search is conducted by a user for a navigation service, the vehicular service including the navigation service, and receive, from the server, a search result signal indicating a result of the destination search,
wherein the signal generation unit configured to generate a sound wave signal including the search result signal, and
the vehicle provides the navigation service based on the sound wave signal including the search result signal.

5. The user device of claim 1, further comprising:
a communication device configured to receive a location signal including certain location information from a device or a server for a navigation service, the vehicular service including the navigation service,
wherein the signal generation unit configured to generate a sound wave signal including the location signal, and
the vehicular provides the navigation service based on the sound wave signal including the location signal.

6. The user device of claim 1, further comprising,
an input device configured to generate a convenience control signal as at least one of seat setting, mirror setting, and steering wheel setting is selected by a user for a driving convenience service, the vehicular service including the driving convenience service,
wherein the signal generation unit configured to generate a sound wave signal including the convenience control signal, and
the vehicle provides the driving convenience service based on the sound wave signal including the convenience control signal.

7. The user device of claim 6,
wherein the seat setting includes an angle and height of a seat, distance between a pedal and a seat, and a temperature of a seat,
the mirror setting includes a position of a room mirror, and positions of side mirrors, and
the steering wheel setting includes a position and a temperature of a steering wheel.

8. The user device of claim 1, further comprising:
an input device configured to generate an air-conditioning control signal as setting for an air-conditioning device of the vehicle is conducted by a user for an air-conditioning control service, the vehicular service including the air-conditioning control service,
wherein the signal generation unit configured to generate a sound wave signal including the air-conditioning control signal, and
the vehicle provides the air-conditioning control service based on the sound wave signal including the air-conditioning control signal.

9. The user device of claim 8,
wherein the setting for the air-conditioning device includes temperatures of an air-conditioner and a heater, and a temperature, humidity, and ventilation in the interior of the vehicle.

10. The user device of claim 1,
wherein the symbols indicate different meanings depending on a certain frequency within an inaudible frequency band or a combination of a plurality of frequencies within an inaudible frequency band, and the storage device is configured to store a mapping table, which pre-defines relationship between the symbols and the certain frequency or relationship between the symbols and the combination of the plurality of the frequencies.

11. A user device, comprising:
a storage device configured to store a program for a vehicular service;
a signal reception device configured receive a sound wave signal emitted from a vehicle; and
a processor configured to search a vehicular service corresponding to the received sound wave signal to implement certain operation for the searched vehicular service,
wherein the signal reception device is further configured to receive a feedback sound wave signal from the vehicle,
the feedback sound wave signal is generated and emitted by one component of the vehicle in response to the sound wave signal emitted from the user device,
the sound wave signal and feedback sound wave signal comprise a certain frequency corresponding to each of a plurality of symbols,
the certain frequency is within an inaudible frequency band,
the sound wave signal and the feedback sound wave signal are configured to control the user device or the vehicle to provide different vehicular services through the inaudible frequency band, and
the user device and the one component of the vehicle communicate with each other based on a sound wave communication.

12. The user device of claim 11,
wherein if the searched vehicular service is a vehicle diagnosis service, the processor is configured to extract a vehicle state signal from the sound wave signal, and
if at least one of a plurality of factors composing a check factor list for the vehicle is abnormal, the vehicle state signal includes a vehicle abnormality signal generated in the vehicle.

13. The user device of claim 12, further comprising:
a communication device configured to transmit the vehicle abnormality signal to a server, and receives a vehicle response signal indicating a responsive measure to the vehicle abnormality signal from the server.

14. The user device of claim 11,
wherein if the searched vehicle service is a vehicle diagnosis service, the processor is configured to extract a vehicle state signal from the sound wave signal, and
the vehicle state signal comprises at least one of fuel information, oil information, internal temperature information and driving information.

15. The user device of claim 11, further comprising:
a display unit configured to display certain information corresponding to the certain operation.

16. The user device of claim 11,
wherein, when the sound wave signal is received, the processor is configured to generate certain sound or vibration.

17. The user device of claim 11,
wherein the symbols indicate different meanings depending on a certain frequency within an inaudible frequency band or combination of a plurality of frequencies within an inaudible frequency band, and
the storage device is configured to store a mapping table, which pre-defines relationship between the symbols and the certain frequency or relationship between the symbols and the combination of the frequencies.

18. A method for providing a vehicular service by using a sound QR system, the method comprising:
storing a program for a vehicular service;
receiving a sound wave signal emitted from a mobile device;
searching a vehicular service corresponding to the received sound wave signal to implement an operation for the searched vehicular service;
generating a feedback sound wave signal in response to the received sound wave signal; and
emitting the generated feedback sound wave signal,
wherein the certain sound wave signal is transmitted through an inaudible or audible frequency band, and differently generated in the mobile device depending on the vehicular service,
the emitted feedback sound wave signal is received by the mobile device,
the sound wave signal and feedback sound wave signal comprise a certain frequency corresponding to each of a plurality of symbols,
the certain frequency is within an inaudible frequency band,
the sound wave signal and the feedback sound wave signal are configured to control the mobile device or the vehicle to provide different vehicular services through the inaudible frequency band, and
the mobile device and the vehicle communicate with each other based on a sound wave communication.

* * * * *